US009560684B2

(12) United States Patent
Sivanesan et al.

(10) Patent No.: US 9,560,684 B2
(45) Date of Patent: Jan. 31, 2017

(54) MITIGATION OF TRAFFIC CONGESTION IN DUAL CONNECTIVITY SYSTEMS

(71) Applicant: INTEL IP CORPORATION, Santa Clara, CA (US)

(72) Inventors: Kathiravetpillai Sivanesan, Richardson, TX (US); Ali Koc, Portland, OR (US); Rath Vannithamby, Portland, OR (US)

(73) Assignee: Intel IP Corporation, Santa Clara, UT (US)

( * ) Notice: Subject to any disclaimer, the term of this patent is extended or adjusted under 35 U.S.C. 154(b) by 289 days.

(21) Appl. No.: 14/317,900

(22) Filed: Jun. 27, 2014

(65) Prior Publication Data

US 2015/0085667 A1  Mar. 26, 2015

Related U.S. Application Data

(60) Provisional application No. 61/883,127, filed on Sep. 26, 2013.

(51) Int. Cl.
*H04L 12/16* (2006.01)
*H04L 12/54* (2013.01)
(Continued)

(52) U.S. Cl.
CPC ............. *H04W 76/023* (2013.01); *H04L 1/12* (2013.01); *H04L 5/0037* (2013.01); *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 24/04* (2013.01); *H04W 36/32* (2013.01); *H04W 40/22* (2013.01); *H04W 40/24* (2013.01);
(Continued)

(58) Field of Classification Search
CPC ................................................... H04W 76/023
See application file for complete search history.

(56) References Cited

U.S. PATENT DOCUMENTS

2009/0116426 A1   5/2009   Ho
2010/0002650 A1*  1/2010   Ahluwalia ............ H04L 1/1874
                                                             370/331
(Continued)

FOREIGN PATENT DOCUMENTS

EP           1516501 B1    1/2010
WO    WO 2013/070162 A1    5/2013

OTHER PUBLICATIONS

3GPP TR 36.842, "Study on Small Cell enhancements for E-UTRA and E-UTRAN; Higher layer aspects", Dec. 2013, Version 12.0.0, Release 12, 71 pages.

*Primary Examiner* — Gerald Smarth
(74) *Attorney, Agent, or Firm* — Thorpe North & Western

(57) ABSTRACT

Technology for mitigating traffic congestion is disclosed. A master evolved node B (MeNB) can identify service data unit (SDU) packets that are dropped in a retransmission buffer of a packet data convergence protocol (PDCP) layer of the MeNB. The MeNB can create a list of packet data unit (PDU) packets that are dropped at the PDCP layer of the MeNB, wherein the PDU packets that are dropped are associated with the SDU packets. The MeNB can send the list of dropped PDU packets, from the PDCP layer of the MeNB to the PDCP layer of a user equipment (UE), to enable the UE to distinguish between delayed PDU packets and the dropped PDU packets.

22 Claims, 8 Drawing Sheets

(51) Int. Cl.

| | |
|---|---|
| *H04W 76/02* | (2009.01) |
| *H04W 76/06* | (2009.01) |
| *H04W 24/04* | (2009.01) |
| *H04L 5/00* | (2006.01) |
| *H04W 40/22* | (2009.01) |
| *H04W 52/02* | (2009.01) |
| *H04L 12/801* | (2013.01) |
| *H04W 72/04* | (2009.01) |
| *H04W 48/16* | (2009.01) |
| *H04W 40/24* | (2009.01) |
| *H04W 88/08* | (2009.01) |
| *H04W 36/32* | (2009.01) |
| *H04L 29/08* | (2006.01) |
| *H04L 1/12* | (2006.01) |
| *H04L 12/803* | (2013.01) |
| *H04W 84/12* | (2009.01) |
| *H04W 92/20* | (2009.01) |

(52) U.S. Cl.
CPC ....... *H04W 48/16* (2013.01); *H04W 52/0274* (2013.01); *H04W 72/0446* (2013.01); *H04W 72/0453* (2013.01); *H04W 76/068* (2013.01); *H04W 88/08* (2013.01); *H04W 84/12* (2013.01); *H04W 92/20* (2013.01)

(56) References Cited

U.S. PATENT DOCUMENTS

| | | | |
|---|---|---|---|
| 2010/0039938 A1 | 2/2010 | Sagfors | |
| 2011/0047430 A1* | 2/2011 | Feuersanger | H04L 1/1812 714/748 |
| 2011/0188377 A1 | 8/2011 | Kim et al. | |
| 2012/0163161 A1* | 6/2012 | Zhang | H04L 1/1874 370/216 |
| 2012/0183142 A1* | 7/2012 | Sharma | H04W 12/04 380/273 |
| 2012/0257509 A1* | 10/2012 | Natarajan | H04B 7/15521 370/241 |
| 2013/0176988 A1* | 7/2013 | Wang | H04W 28/08 370/331 |
| 2013/0265979 A1* | 10/2013 | Yamaguchi | H04W 28/0278 370/329 |
| 2013/0315066 A1* | 11/2013 | Xu | H04W 28/0289 370/236 |
| 2014/0056243 A1* | 2/2014 | Pelletier | H04W 74/04 370/329 |
| 2015/0043435 A1* | 2/2015 | Blankenship | H04L 69/322 370/329 |
| 2015/0098322 A1* | 4/2015 | Chen | H04W 72/0413 370/230 |

* cited by examiner

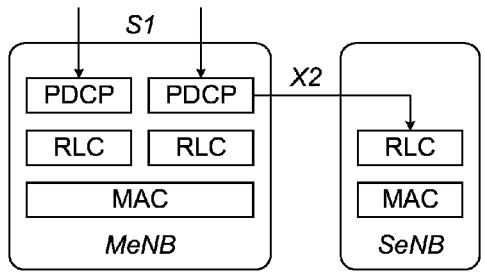
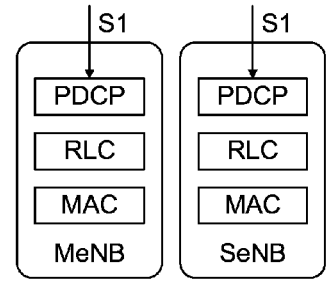
FIG. 1A
FIG. 1B
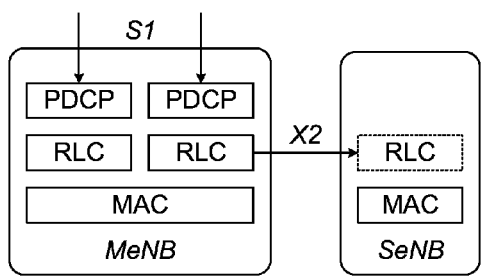
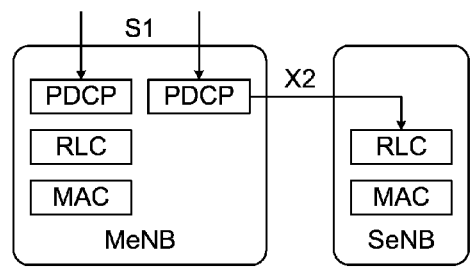
FIG. 1C
FIG. 1D
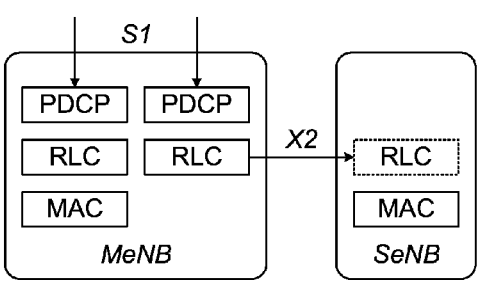
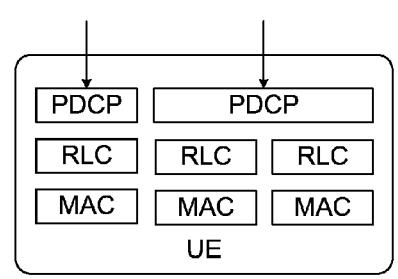
FIG. 1E
FIG. 1F

MITIGATION OF TRAFFIC CONGESTION IN DUAL CONNECTIVITY SYSTEMS

RELATED APPLICATIONS

The present application claims priority to U.S. Provisional Patent Application No. 61/883,127, filed Sep. 26, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 1A-1E illustrate dual connectivity architectures in accordance with an example;

FIG. 1F illustrates an architecture of a user equipment (UE) operable to support dual connectivity in accordance with an example;

Figure 2:
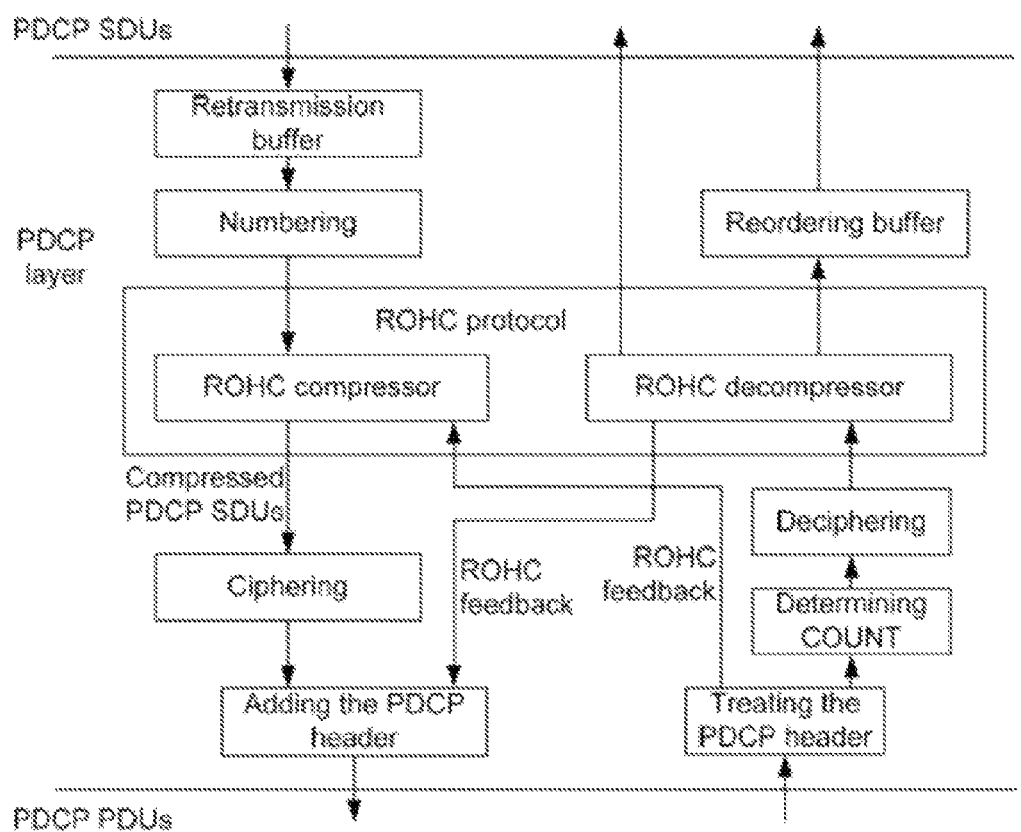
FIG. 2 illustrates a legacy user plane packet data convergence protocol (PDCP) layer in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 12.0, user equipments (UEs) may connect to more than one cell site simultaneously. For example, the UE may connect to a master evolved node B (MeNB) and at least one secondary evolved node B (SeNB) simultaneously. When the UE connects to two cells, the UE may receive data bearers from both cells at substantially the same time. The multiple bearers may be sent to the UE based on a location of an S1-U termination and location of the bearer split. In one example, the S1-U may be terminated at the MeNB and the bearer split may be performed at a packet data convergence protocol (PDCP) layer in the MeNB.

FIG. 1A illustrates an example of a dual connectivity architecture for a master evolved node B (MeNB) and a secondary evolved node B (SeNB). The S1-U may be terminated at the MeNB and the bearer split may occur at the MeNB. In addition, independent radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers at the PDCP layer (e.g., IP layer or application layer). In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

FIG. 1B illustrates another example of a dual connectivity architecture for a master evolved node B (MeNB) and a secondary evolved node B (SeNB). The S1-U may be terminated at the SeNB, and both the SeNB and the MeNB may include independent packet data convergence protocols (PDCPs), i.e., no bearer split. The MeNB and the SeNB may be connected to an Evolved Packet Core (EPC) via an S1 interface. For example, the MeNB and the SeNB may be connected to a serving gateway (S-GW) or mobility management entity (MME) via the S1 interface. The MeNB may include a PDCP layer, a radio link control (RLC) layer and a media access channel (MAC) layer. In addition, the SeNB may include a separate PDCP layer, RLC layer and MAC layer. The PDCP layer in the MeNB may receive data or control information from higher layers, and the PDCP layer in the SeNB may receive data or control information from higher layers.

FIG. 1C illustrates yet another example of a dual connectivity architecture for a master evolved node B (MeNB) and a secondary evolved node B (SeNB). The S1-U may be terminated at the MeNB and the bearer split may occur at the MeNB. In addition, master-slave radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

FIG. 1D illustrates yet another example of a dual connectivity architecture for a master evolved node B (MeNB) and a secondary evolved node B (SeNB). The S1-U may be terminated at the MeNB and no bearer split may occur at the MeNB. In addition, an independent radio link control (RLC) may be present at the SeNB. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers at the PDCP layer. In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

FIG. 1E illustrates yet another example of a dual connectivity architecture for a master evolved node B (MeNB) and a secondary evolved node B (SeNB). The S1-U may be terminated at the MeNB and no bearer split may occur at the MeNB. In addition, a master-slave radio link control (RLC) may be present for the SeNB bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

The dual connectivity architectures described in FIGS. 1A-1E are further discussed in 3GPP Technical Review (TR) 36.842 Version 12.0.0.

FIG. 1F illustrates exemplary architecture of a user equipment (UE). The UE may be configured to communicate with a master evolved node B (MeNB) and a secondary evolved node B (SeNB) in a dual connectivity architecture. The UE may include a PDCP layer, a RLC layer and a MAC layer. The PDCP layer in the UE may receive data and/or control information from the MeNB. In addition, the PDCP layer in the UE may receive data and/or control information from the SeNB. In one example, the data or control information may be communicated from the PDCP layer in the UE to lower layers in the UE (e.g., the RLC and MAC layers).

In one configuration, the PDCP layer in the MeNB may receive packets (e.g., PDCP SDU packets or PDCP PDU packets) from higher layers in the downlink. The higher layers may include the IP layer or application layer in the MeNB. The PDCP layer may temporarily store the packets in a retransmission buffer. In other words, the packets may be temporarily stored in the retransmission buffer until the packets are ready to be communicated (i.e., retransmitted) in downlink to the UE or the SeNB. For example, the packets in the retransmission buffer may be communicated from the MeNB to the UE via a MeNB radio link. As another example, the packets in the retransmission buffer may be communicated from the MeNB to the SeNB via a SeNB radio link.

In one example, the retransmission buffer may have a limited capacity. Therefore, the retransmission buffer may discard the packets according to a discard counter. In other words, if the packet has been in the retransmission buffer for a predefined period of time, the packet may be flushed to clear space in the retransmission buffer for additional packets.

A potential overflow may be detected at the retransmission buffer in the downlink when the retransmission buffer is filling up with packets. In other words, the number of packets in the retransmission buffer may be approaching a defined maximum. Alternatively, the potential overflow may be detected at a reordering buffer in the uplink when the reordering buffer is filling up with packets. The potential overflow may result from delay or capacity constraints of an X2 interface between the MeNB and the SeNB, the MeNB radio link between the MeNB and the UE, and/or the SeNB radio link between the SeNB and the UE. In other words, the packets may be stalled at the retransmission buffer when the delay or capacity constraints are preventing the packets from being communicated to the UE and/or SeNB. In another example, the packets may be stalled at the retransmission buffer due to problems in the RLC or MAC layers of the SeNB.

When the packets remain in the retransmission buffer for a period of time that exceeds the discard counter (e.g., due to the delay or capacity constraints), the packets may be removed from the retransmission buffer. However, some of the packets may be unnecessarily flushed in the retransmission buffer. In other words, these packets need to be communicated to the UE, but were stalled in the retransmission buffer for longer than the discard counter because of the delay or capacity constraints. Therefore, the discard counter may be extended based on a type of traffic associated with the packets. As a result, flushing of the retransmission buffer due to slow delivery of the packets to the UE and/or SeNB may be avoided. For example, the discard counter may be extended when the packets are related to delay-tolerant traffic (i.e., no time constraints). On the other hand, the discard counter may not be extended when the packets are related to delay-sensitive traffic, such as voice over internet protocol (VoIP) or video streaming. Therefore, the packets in the retransmission buffer may not be discarded as quickly (i.e., the discard counter is extended) when the packets are related to delay-tolerant traffic, and alternatively, the packets at the retransmission buffer may be discarded according to the discard counter when the packets are related to delay-sensitive traffic.

In one example, the PDCP mechanism in the UE and MeNB is dependent on COUNT to prevent replay attacks. The COUNT may be maintained at the UE and MeNB and can be incremented for every transmitted PDCP PDU. To provide robustness against lost packets, least significant bits of the COUNT are carried as PDCP sequence numbers (SNs). A length of the PDCP SN may be increased to multiple bits, thereby extending the discard counter in the retransmission buffer.

In one configuration, the number of packets (e.g., PDCP SDU packets or PDCP PDU packets) in the retransmission buffer in the PDCP layer of the MeNB may increase due to latency of the X2 connection. For example, the X2 connection between the MeNB and the SeNB may experience delay or capacity constraints, and therefore, the packets may be stalled in the retransmission buffer of the MeNB. The PDCP layer in the MeNB may drop one or more packets to mitigate the potential overflow at the retransmission buffer. In addition, the PDCP layer in the MeNB may drop one or more packets in the retransmission buffer in order to indicate to upper layers, such as the internet protocol (IP) layer or application layer, to slow down a rate of packet transmissions to the PDCP layer in the MeNB. In other words, the dropping of packets at the retransmission buffer may indicate an overflow buffer status to the IP layer, and in response, the IP layer can send fewer packets to the PDCP layer in the MeNB. As a result, the number of packets stored in the retransmission buffer may be reduced and overflow at the retransmission buffer can be avoided.

In addition, when the DL discard timer expires at the MeNB, some of the PDCP packets in the retransmission buffer may have been transmitted as PDCP PDUs to the RLC layer and to lower layers in the MeNB. As an example, when the DL discard timer expires, there are five PDCP packets in the retransmission buffer (e.g., A, B, C, D and E). The packets A and B may have been already sent to the RLC layer, but the ACKs have not yet been received. If the packets A and B are discarded, then the UE may be notified that packets A and B were discarded.

When the PDCP layer of the MeNB drops one or more packets from the retransmission buffer, the PDCP layer in the UE does not know which packets are dropped. Rather, when the UE does not receive the packets on time from the MeNB, the UE may believe that the packets are delayed, the packets were lost over the air and/or the packets are going to be retransmitted to the UE from the MeNB. Therefore, the UE may unnecessarily wait for the packets without realizing that the packets have been dropped at the MeNB. In one configuration, the PDCP layer in the MeNB may send a list of packets (e.g., PDCP PDUs) to the PDCP layer in the UE, wherein the list of packets indicate packets that were dropped at the MeNB. In addition, the list of packets may include an identifier associated with each of the dropped packets. As an example, when the UE reassembles the packets, the UE may know that packets X and Y were dropped at the MeNB and that the UE should not wait for these packets to arrive at the UE. Thus, the list of packets may enable the UE to distinguish between dropped packets and delayed packets.

In one configuration, the PDCP layer in the MeNB may receive a plurality of packets from higher layers (e.g., IP layer or application layer). The PDCP layer in the MeNB may calculate a downlink split ratio (i.e., the percentage of packets that are to be served directly to the UE using the MeNB link and the percentage of packets that are to be served to the UE via the SeNB using the SeNB link). As an example, the PDCP layer in the MeNB may receive ten packets. The PDCP layer may push six of the ten packets (i.e., 60%) to the UE via the SeNB and the remaining four packets (i.e., 40%) may be pushed down through the MeNB link to the UE. In other words, the 60/40 relationship may describe the downlink split ratio at the PDCP layer in the MeNB. When the retransmission buffer in the MeNB is approaching a predefined capacity (e.g., due to X2 interface delay, MeNB radio link delay, SeNB radio link delay), the MeNB may recalculate the downlink split ratio in order to reduce an amount of time to deliver the packets to the UE.

As an example, the number of packets in the retransmission buffer may be steadily increasing and the X2 connection between the MeNB and the SeNB is known to be delayed and lossy. Therefore, in order to optimize packet flow to the UE, the MeNB may change the 60/40 split ratio to 10/90. In other words, the PDCP layer in the MeNB may push one out of ten packets (i.e., 10%) to the UE via the SeNB and the remaining nine packets (i.e., 90%) may be pushed down through the MeNB link to the UE. Therefore, the MeNB may send fewer packets to the UE via the SeNB and more packets directly to the UE when the X2 connection between the MeNB and the SeNB is delayed.

In one configuration, the PDCP layer in the UE may also include a retransmission buffer. The retransmission buffer may temporarily store packets to be communicated to the SeNB and/or MeNB. In the uplink, a discard counter associated with the retransmission buffer may be extended based on a traffic type associated with the packets. For example, the discard counter may be extended when the packets are related to delay-tolerant traffic (i.e., no time constraints). On the other hand, the discard counter may not be extended when the packets are related to delay-sensitive traffic, such as voice over internet protocol (VoIP) or video streaming. Therefore, premature flushing of the packets in the retransmission buffer of the UE due to capacity and latency constraints in the links (e.g., MeNB radio link, SeNB radio link) may be avoided when the discard counter is extended at the UE.

In one example, the retransmission buffer in the PDCP layer of the UE may drop one or more packets. In the uplink, the retransmission buffer may drop the packets when overflow at the retransmission buffer is imminent. The dropping of the packets may indicate an overflow buffer status to the IP layer, which can result in the IP layer and application layer reducing a data rate to the retransmission buffer. In other words, the IP layer may send fewer packets to the retransmission buffer when the IP layer recognizes a potential overflow at the retransmission buffer. The PDCP layer in the UE may send a list of packets to the PDCP layer in the MeNB, wherein the list of packets includes dropped packets at the UE. Therefore, the MeNB may identify which packets are dropped at the UE and which packets are delayed at the UE.

In addition, when the UL discard timer expires at the UE, some of the PDCP packets in the retransmission buffer may have been transmitted as PDCP PDUs to the RLC layer and to lower layers in the UE. As an example, when the UL discard timer expires, there are five PDCP packets in the retransmission buffer (e.g., A, B, C, D and E). The packets A and B may have been already sent to the RLC layer, but the ACKs have not yet been received. If the packets A and B are discarded, then the MeNB may be notified that packets A and B were discarded.

In one configuration, the UE may send a buffer status and/or a request for a modified uplink (UL) split ratio to the PDCP layer in the MeNB in response to detecting the potential overflow at the retransmission buffer in the UE. As an example, in the uplink, the PDCP layer in the UE may send 50% of packets to the MeNB via the MeNB radio link and 50% of packets to the SeNB via the SeNB radio link. However, the SeNB radio link may be congested and, as a result, the packets to be communicated via the SeNB radio link can be stalled at the retransmission buffer. The PDCP layer in the MeNB may determine the modified UL split ratio and send the modified UL split ratio to the UE. The UE may send packets to the MeNB and the SeNB according to the modified UL split ratio. For example, the PDCP layer in the UE may send 80% of packets to the MeNB via the MeNB radio link and 20% of packets to the SeNB via the SeNB radio link according to the modified split ratio. In other words, the UE may send fewer packets to the SeNB due to the latency in the SeNB radio link. When the latency is substantially gone, the UE may again request the MeNB to modify the UL split ratio.

FIG. 2 illustrates a legacy user plane packet data convergence protocol (PDCP) layer. In one example, the PDCP layer may be in a master evolved node B (MeNB). In the downlink, the PDCP layer in the MeNB may receive PDCP service data units (SDUs) from higher layers (e.g., the IP layer or application layer). The PDCP SDUs may be stored in a retransmission buffer at the PDCP layer in the MeNB. A numbering function may be applied to the PDCP SDUs. The PDCP layer may perform header compression using the RObust Header Compression (ROHC) protocol defined by the IETF (Internet Engineering Task Force), which can result in compressed PDCP SDUs. Ciphering may be applied to the compressed PDCP SDUs and a PDCP header can be added. In addition, the PDCP SDUs may be converted to PDCP packet data units (PDUs). The PDCP PDUs may be communicated in the downlink, for example, to the UE.

In the uplink, the PDCP layer in the MeNB may receive PDCP PDUs from the UE (either directly from the UE or via the SeNB). The PDCP headers in the PDCP PDUs may be treated and a COUNT may be determined. A PDCP PDU counter (known as COUNT) may be used as input to the security algorithms. The COUNT value is incremented for each PDCP PDU during a radio resource control (RRC) connection. The COUNT has a length of 32 bits in order to allow an acceptable duration for the RRC connection. During the RRC connection, the COUNT value is maintained at the MeNB by counting each received PDCP PDU. Deciphering may be applied to the PDCP PDUs. The PDCP layer may perform header decompression and store the PDCP PDUs in a reordering buffer. In addition, the PDCP PDUs may be converted to PDCP SDUs. The PDCP SDUs may be communicated in the uplink from the PDCP layer to higher layers in the MeNB (e.g., IP layer or application layer). In other words, the PDCP SDUs may be arranged in a correct order before the PDCP PDUs are sent to the IP layer.

Figure 3A:
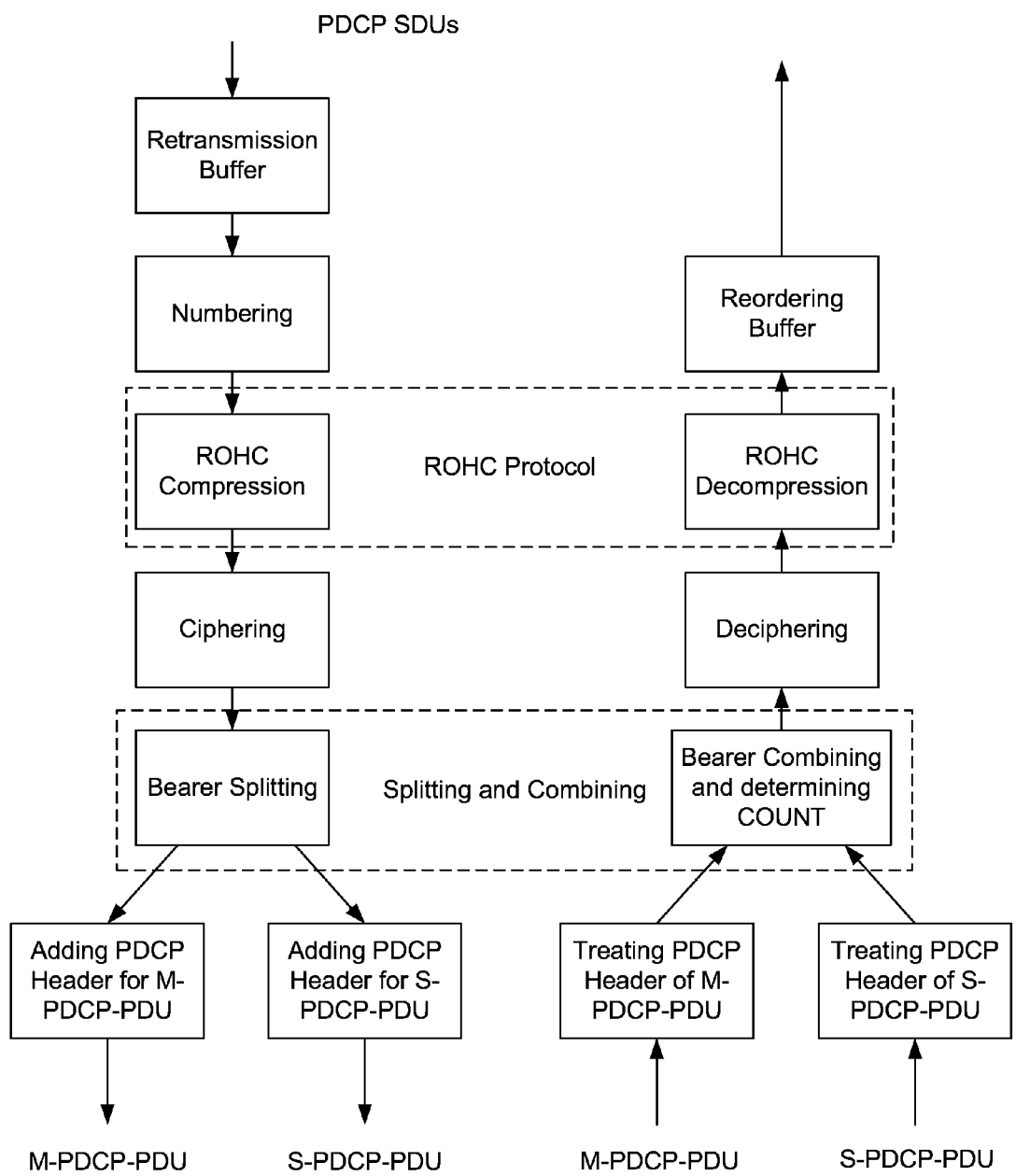
FIG. 3A illustrates a packet data convergence protocol (PDCP) layer in a master evolved node B (MeNB) in accordance with an example.

FIG. 3A illustrates a novel user plane packet data convergence protocol (PDCP) layer in a master evolved node B (MeNB). In the downlink, PDCP SDUs may be received at the retransmission buffer from higher layers in the MeNB. A numbering function may be applied to the PDCP SDUs. The PDCP layer may perform header compression using a ROHC protocol, which can result in compressed PDCP SDUs. Ciphering may be applied to the compressed PDCP SDUs. In addition, the PDCP SDUs may be converted to PDCP PDUs. A bearer split may occur after the ciphering is performed. In other words, the bearer split may refer to an ability to split a bearer over multiple eNBs in dual connectivity. The bearer split may be performed based on a split ratio. Based on the split ratio, a first portion of the PDCP PDUs may become M-PDCP PDUs and a second portion of the PDCP PDUs may become S-PDCP PDUs. A first PDCP header may be added to the M-PDCP PDUs and a second PDCP header may be added to the S-PDCP PDUs. The MeNB may communicate the M-PDCP PDUs to the UE via a MeNB radio link. In addition, the MeNB may communicate the S-PDCP PDUs to the SeNB via an X2 interface, wherein the SeNB may communicate the S-PDCP PDUs to the UE via a SeNB radio link.

In the uplink, the PDCP layer in the MeNB may receive the M-PDCP PDUs from lower layers in the MeNB. In addition, the PDCP layer may receive the S-PDCP PDUs from lower layers in the MeNB. The PDCP layer in the MeNB may treat the PDCP headers of the M-PDCP PDUs. In addition, the PDCP layer in the MeNB may treat the PDCP headers of the S-PDCP PDUs. The PDCP layer may combine the bearers and determine a COUNT. In other words, the M-PDCP PDUs and the S-PDCP PDUs may be combined into PDCP PDUs. The PDCP PDUs may be converted to PDCP SDUs. Deciphering may be applied to the PDCP SDUs. The PDCP layer may perform ROHC decompression and store the PDCP SDUs in a reordering buffer, wherein the reordering buffer assembles the PDCP SDUs in a correct order. The PDCP SDUs may be communicated in the uplink from the PDCP layer to higher layers in the MeNB, such as the IP layer or application layer.

Figure 3B:
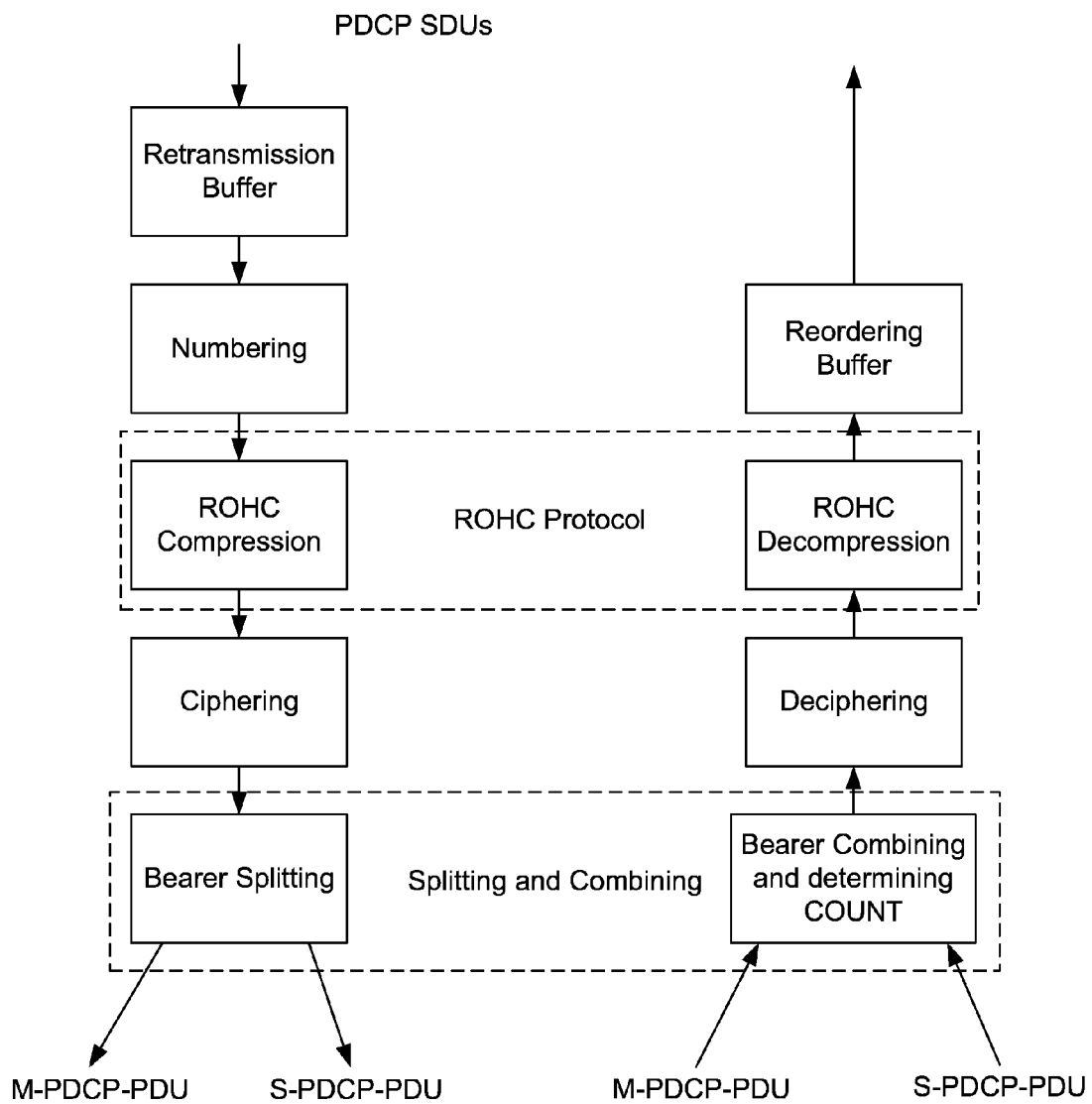
FIG. 3B illustrates a packet data convergence protocol (PDCP) layer in a user equipment (UE) in accordance with an example.

FIG. 3B illustrates a novel user plane packet data convergence protocol (PDCP) layer in a user equipment (UE). In the downlink, PDCP SDUs may be received at the PDCP layer in the UE from higher layers and stored at the retransmission buffer. A numbering function may be applied to the PDCP SDUs. The PDCP layer may perform header compression using a ROHC protocol, which can result in compressed PDCP SDUs. Ciphering may be applied to the compressed PDCP SDUs. In addition, the PDCP SDUs may be converted to PDCP PDUs. A bearer split may occur after the ciphering is performed. The bearer split may be performed based on a split ratio, wherein the split ratio is determined by the MeNB. Based on the split ratio, a first portion of the PDCP PDUs may become M-PDCP PDUs and a second portion of the PDCP PDUs may become S-PDCP PDUs. The UE may communicate the M-PDCP PDUs to a master evolved node B (MeNB) via a MeNB radio link. In addition, the UE may communicate the S-PDCP PDUs to a secondary evolved node B (SeNB) via a SeNB radio link.

In the uplink, the PDCP layer in the UE may receive the M-PDCP PDUs from lower layers in the UE. In addition, the PDCP layer in the UE may receive the S-PDCP PDUs from lower layers in the UE. The PDCP layer in the UE may combine the bearers and determine a COUNT. In other words, the M-PDCP PDUs and the S-PDCP PDUs may be combined into PDCP PDUs. The PDCP PDUs may be converted into PDCP SDUs. Deciphering may be applied to the PDCP SDUs. The PDCP layer may perform ROHC decompression and store the PDCP SDUs in a reordering buffer, wherein the reordering buffer assembles the PDCP SDUs in a correct order. In the uplink, the PDCP SDUs may be communicated from the PDCP layer to higher layers in the UE.

Figure 4:
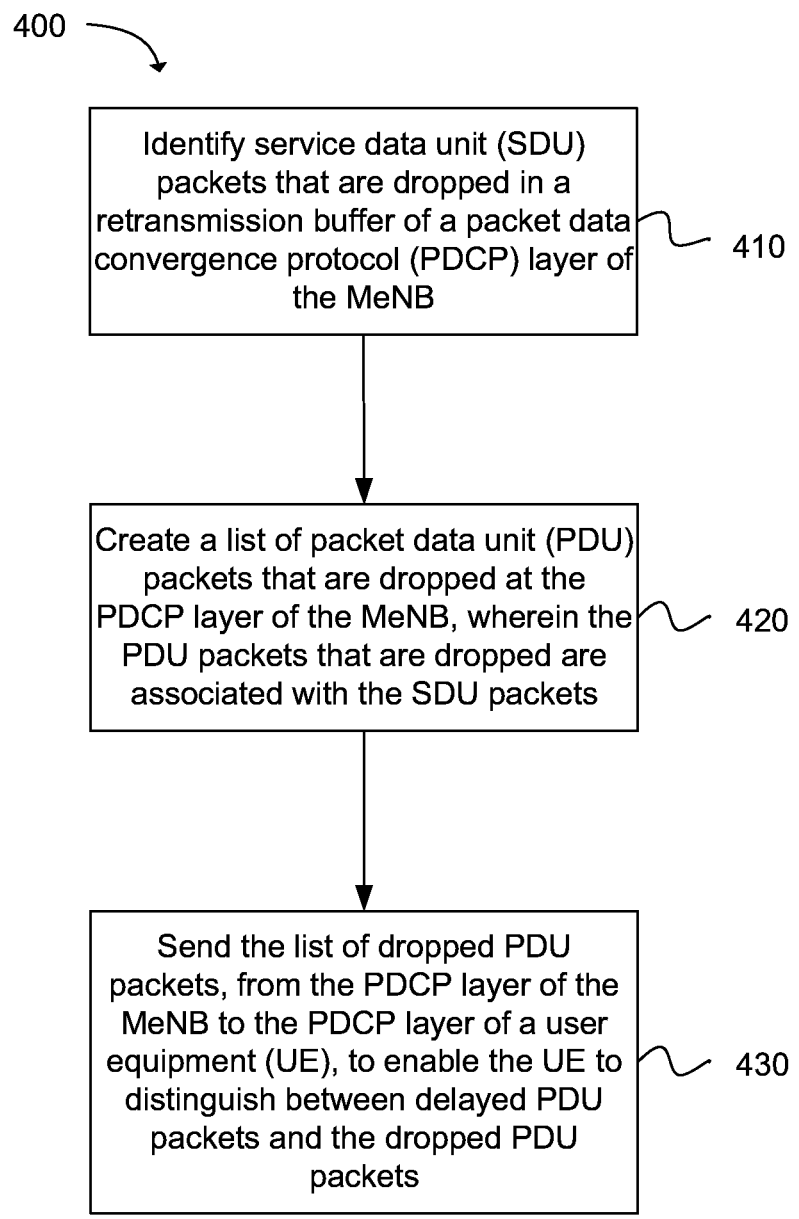
FIG. 4 depicts functionality of computer circuitry of a master evolved node B (MeNB) operable to mitigate traffic congestion in accordance with an example.

Another example provides functionality 400 of computer circuitry of a master evolved node B (MeNB) operable to mitigate traffic congestion, as shown in the flow chart in FIG. 4. The functionality may be implemented as a method or the functionality may be executed as instructions on a machine, where the instructions are included on at least one computer readable medium or one non-transitory machine readable storage medium. The computer circuitry can be configured to identify service data unit (SDU) packets that are dropped in a retransmission buffer of a packet data convergence protocol (PDCP) layer of the MeNB, as in block 410. The computer circuitry can be configured to create a list of packet data unit (PDU) packets that are dropped at the PDCP layer of the MeNB, wherein the PDU packets that are dropped are associated with the SDU packets, as in block 420. The computer circuitry can be configured to send the list of dropped PDU packets, from the PDCP layer of the MeNB to the PDCP layer of a user equipment (UE), to enable the UE to distinguish between delayed PDU packets and the dropped PDU packets, as in block 430.

In one example, dropping the PDU packets can indicate an overflow buffer status to an internet protocol (IP) layer, wherein the IP layer reduces a packet rate to the PDCP layer at the MeNB in response to the overflow buffer status. In another example, the PDU packets are dropped in response to detecting a potential overflow at a retransmission buffer of the MeNB. In yet another example, the potential overflow is due to delay or capacity constraints on at least one of: an X2 link between the MeNB and a secondary evolved node B (SeNB), a radio link between the MeNB and the UE, or a radio link between the SeNB and the UE.

In one example, computer circuitry can be further configured to recalculate a downlink (DL) split ratio when the potential overflow occurs at the retransmission buffer, the DL split ratio defining a first percentage of PDU packets to be transmitted to the UE via the SeNB and a second percentage of PDU packets to be transmitted directly to the UE. In addition, the computer circuitry can be further configured to: detect a potential overflow at a retransmission buffer of the MeNB, wherein SDU packets are stored in the retransmission buffer for retransmission in downlink to one of the UE or a secondary evolved node B (SeNB); detect a type of traffic associated with the SDU packets; and extend a discard counter at the retransmission buffer based in part on the type of traffic associated with the SDU packets in order to avoid premature flushing of the SDU packets at the retransmission buffer.

In one example, the computer circuitry can be further configured to extend the discard counter at the retransmission buffer when the type of traffic associated with the SDU packets is delay-tolerant traffic. In addition, the computer circuitry can be further configured to not extend the discard counter at the retransmission buffer when the type of traffic associated with the SDU packets is delay-sensitive traffic. In one configuration, extending the discard counter at the retransmission buffer includes increasing a length of a packet data convergence protocol sequence number (PDCP SN) to include multiple least significant bits. In addition, the computer circuitry can be further configured to communicate with a secondary evolved node B (SeNB) via an X2 link in a dual connectivity architecture.

Figure 5:
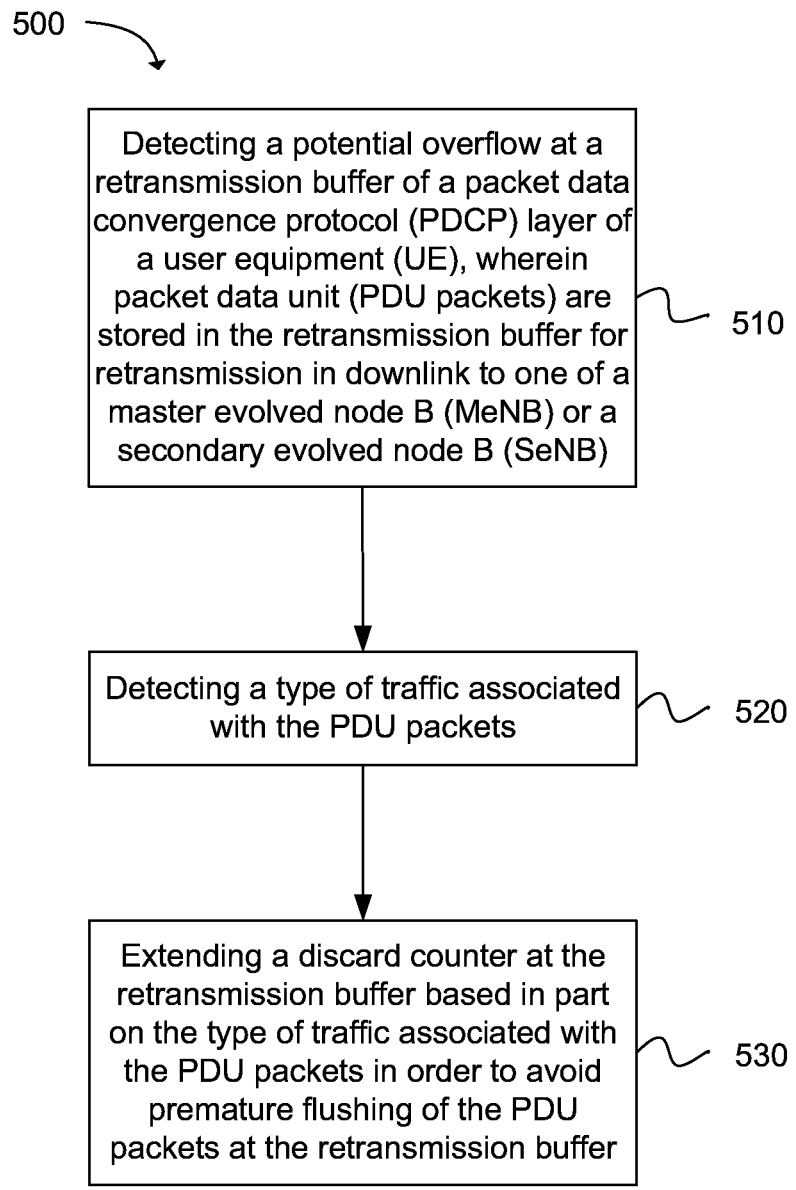
FIG. 5 depicts a flowchart of a method for mitigating traffic congestion in accordance with an example.

Another example provides a method 500 for mitigating traffic congestion, as shown in the flow chart in FIG. 5. The method may be executed as instructions on a machine, where the instructions are included on at least one computer readable medium or one non-transitory machine readable storage medium. The method can include the operation of detecting a potential overflow at a retransmission buffer of a packet data convergence protocol (PDCP) layer of a user equipment (UE), wherein packet data unit (PDU packets) are stored in the retransmission buffer for retransmission in downlink to one of a master evolved node B (MeNB) or a secondary evolved node B (SeNB), as in block 510. The method can include the operation of detecting a type of traffic associated with the PDU packets, as in block 520. The method can include the operation of extending a discard counter at the retransmission buffer based in part on the type of traffic associated with the PDU packets in order to avoid premature flushing of the PDU packets at the retransmission buffer, as in block 530.

In one example, the method can include extending the discard counter at the retransmission buffer when the type of traffic associated with the PDU packets is delay-tolerant traffic. In addition, the method can include determining to not extend the discard counter at the retransmission buffer when the type of traffic associated with the PDU packets is delay-sensitive traffic.

In one example, the method can include identifying service data unit (SDU) packets that are dropped in the retransmission buffer of the PDCP layer of the UE, wherein the SDU packets are dropped in response to detecting the potential overflow at the retransmission buffer; creating a list of packet data unit (PDU) packets that are dropped at the PDCP layer of the UE, wherein the PDU packets that are dropped are associated with the SDU packets; and sending the list of dropped PDU packets, from the PDCP layer of the UE to the PDCP layer of the MeNB to enable the MeNB to distinguish between delayed PDU packets and the dropped PDU packets. In one configuration, the PDU packets are dropped to indicate an overflow buffer status to an internet protocol (IP) layer to reduce a packet rate to the PDCP layer at the UE.

In one example, the method can include dropping the PDU packets due to delay or capacity constraints of at least one of: an X2 link between the MeNB and the SeNB, a radio link between the MeNB and the UE, or a radio link between the SeNB and the UE. In addition, the method can include dropping the PDU packets to indicate a buffer status to an internet protocol (IP) layer, wherein the IP layer reduces a packet rate to the PDCP layer at the UE in response to the overflow buffer status. In one aspect, the method can include requesting a modified uplink (UL) split ratio from the MeNB when the potential overflow occurs at the retransmission buffer of the UE. In one configuration, the UE includes an antenna, a touch sensitive display screen, a speaker, a microphone, a graphics processor, an application processor, an internal memory, or a non-volatile memory port.

Figure 6:
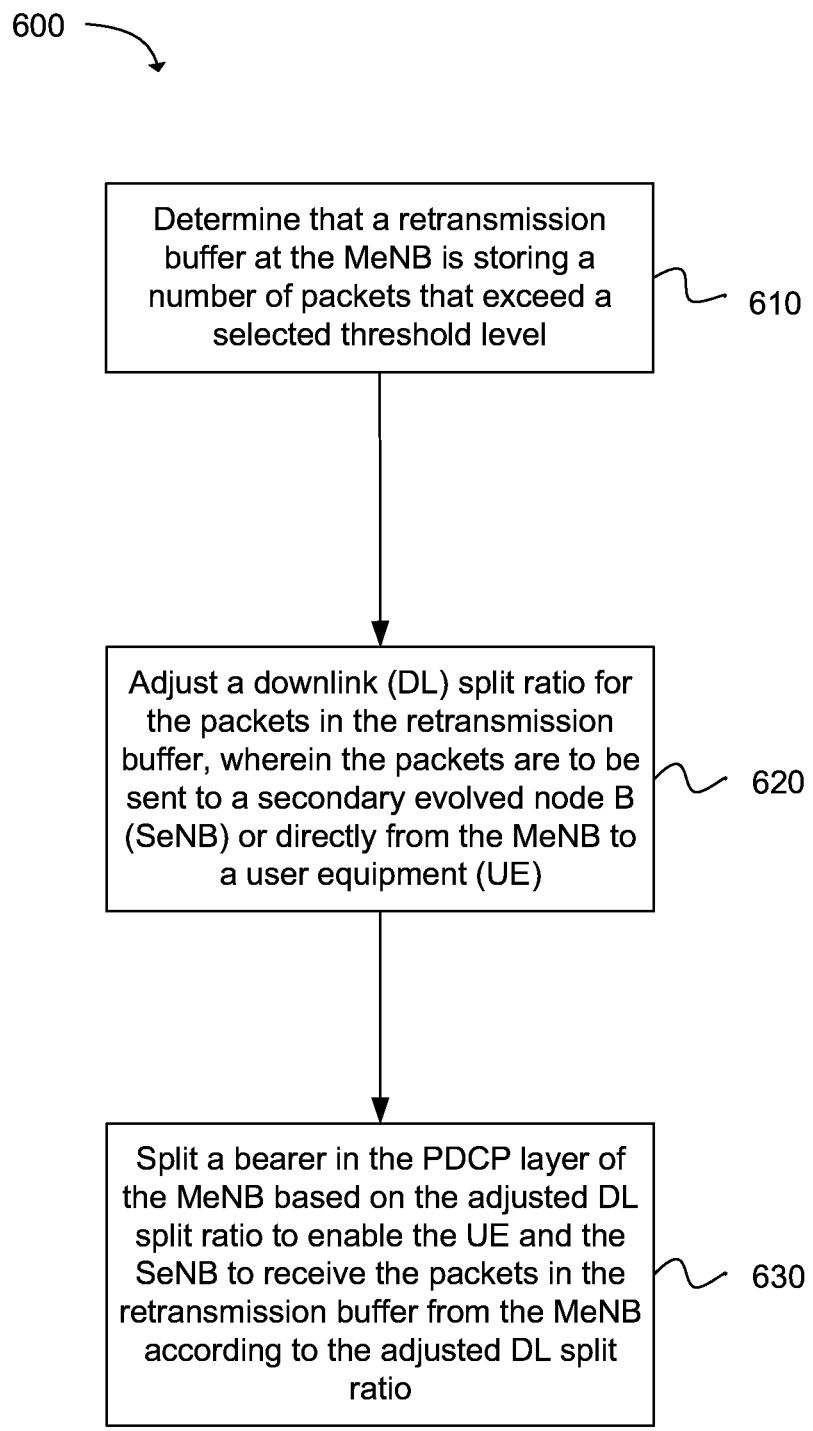
FIG. 6 depicts functionality of computer circuitry of a master evolved node B (MeNB) operable to mitigate traffic congestion in accordance with an example.

Another example provides functionality 600 of computer circuitry of a master evolved node B (MeNB) operable to mitigate traffic congestion, as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to determine that a retransmission buffer at the MeNB is storing a number of packets that exceed a selected threshold level, as in block 610. The computer circuitry can be configured to adjust a downlink (DL) split ratio for the packets in the retransmission buffer, wherein the packets are to be sent to a secondary evolved node B (SeNB) or directly from the MeNB to a user equipment (UE), as in block 620. The computer circuitry can be further configured to split a bearer in the PDCP layer of the MeNB based on the adjusted DL split ratio to enable the UE and the SeNB to receive the packets in the retransmission buffer from the MeNB according to the adjusted DL split ratio.

In one configuration, the retransmission buffer is at a packet data convergence protocol (PDCP) layer of the MeNB. In one example, the computer circuitry can be further configured to adjust the DL split ratio for the packets in the retransmission buffer in response to detecting delay or capacity constraints on an X2 link between the MeNB and the SeNB.

Figure 7:
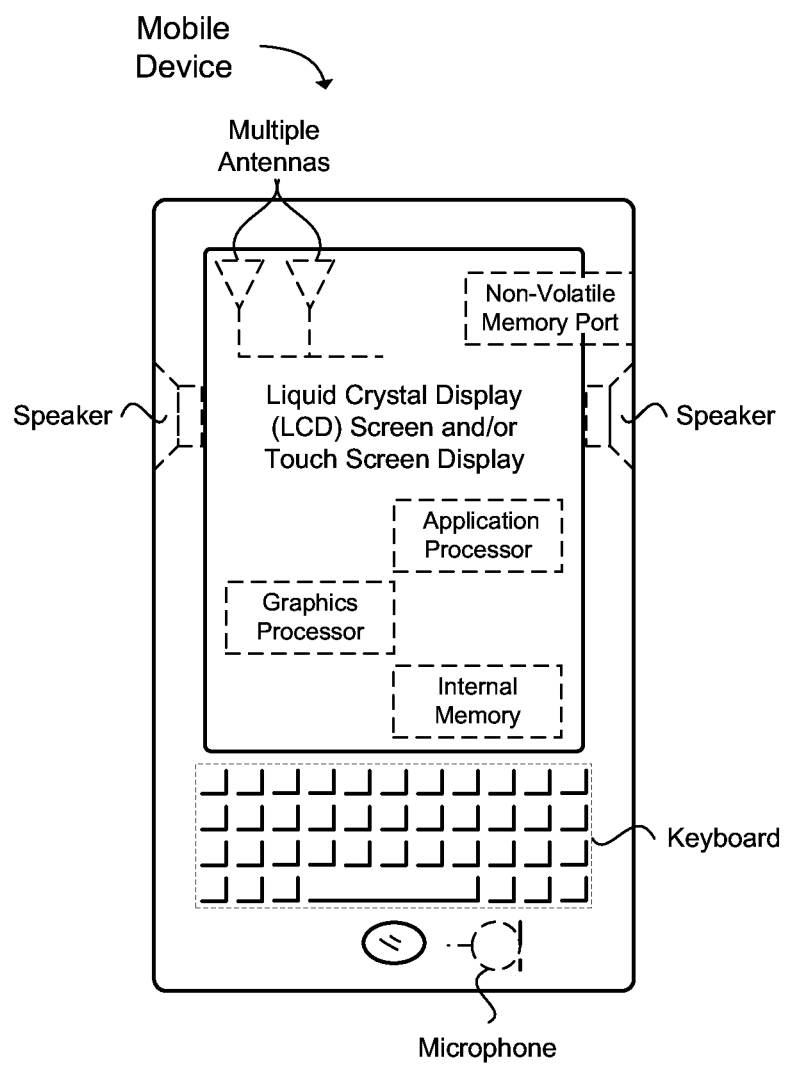
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi.

The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A master evolved node B (MeNB) operable to mitigate traffic congestion, the MeNB having computer circuitry configured to:

identify service data unit (SDU) packets that are dropped in a retransmission buffer of a packet data convergence protocol (PDCP) layer of the MeNB;

create a list of packet data unit (PDU) packets that are dropped at the PDCP layer of the MeNB, wherein the PDU packets that are dropped are associated with the SDU packets; and send the list of dropped PDU packets, from the PDCP layer of the MeNB to the PDCP layer of a user equipment (UE), to enable the UE to distinguish between delayed PDU packets and the dropped PDU packets.

2. The computer circuitry of claim 1, wherein dropping the PDU packets indicates an overflow buffer status to an internet protocol (IP) layer, wherein the IP layer reduces a packet rate to the PDCP layer at the MeNB in response to the overflow buffer status.

3. The computer circuitry of claim 1, wherein the PDU packets are dropped in response to detecting a potential overflow at a retransmission buffer of the MeNB.

4. The computer circuitry of claim 3, wherein the potential overflow is due to delay or capacity constraints on at least one of: an X2 link between the MeNB and a secondary evolved node B (SeNB), a radio link between the MeNB and the UE, or a radio link between the SeNB and the UE.

5. The computer circuitry of claim 3, further configured to recalculate a downlink (DL) split ratio when the potential overflow occurs at the retransmission buffer, the DL split ratio defining a first percentage of PDU packets to be transmitted to the UE via the SeNB and a second percentage of PDU packets to be transmitted directly to the UE.

6. The computer circuitry of claim 1, further configured to:

detect a potential overflow at a retransmission buffer of the MeNB, wherein SDU packets are stored in the retransmission buffer for retransmission in downlink to one of the UE or a secondary evolved node B (SeNB);

detect a type of traffic associated with the SDU packets; and extend a discard counter at the retransmission buffer based in part on the type of traffic associated with the SDU packets in order to avoid premature flushing of the SDU packets at the retransmission buffer.

7. The computer circuitry of claim 6, further configured to extend the discard counter at the retransmission buffer when the type of traffic associated with the SDU packets is delay-tolerant traffic.

8. The computer circuitry of claim 6, further configured to not extend the discard counter at the retransmission buffer when the type of traffic associated with the SDU packets is delay-sensitive traffic.

9. The computer circuitry of claim 6, wherein extending the discard counter at the retransmission buffer includes increasing a length of a packet data convergence protocol sequence number (PDCP SN) to include multiple least significant bits.

10. The computer circuitry of claim 1, further configured to communicate with a secondary evolved node B (SeNB) via an X2 link in a dual connectivity architecture.

11. A method for mitigating traffic congestion, the method comprising:

detecting a potential overflow at a retransmission buffer of a packet data convergence protocol (PDCP) layer of a user equipment (UE), wherein packet data unit (PDU packets) are stored in the retransmission buffer for retransmission in downlink to one of a master evolved node B (MeNB) or a secondary evolved node B (SeNB);

detecting a type of traffic associated with the PDU packets; and extending a discard counter at the retransmission buffer based in part on the type of traffic associated with the PDU packets in order to avoid premature flushing of the PDU packets at the retransmission buffer.

12. The method of claim 11, further comprising extending the discard counter at the retransmission buffer when the type of traffic associated with the PDU packets is delay-tolerant traffic.

13. The method of claim 11, further comprising determining to not extend the discard counter at the retransmission buffer when the type of traffic associated with the PDU packets is delay-sensitive traffic.

14. The method of claim 11, further comprising:

identifying service data unit (SDU) packets that are dropped in the retransmission buffer of the PDCP layer of the UE, wherein the SDU packets are dropped in response to detecting the potential overflow at the retransmission buffer;

creating a list of packet data unit (PDU) packets that are dropped at the PDCP layer of the UE, wherein the PDU packets that are dropped are associated with the SDU packets; and sending the list of dropped PDU packets, from the PDCP layer of the UE to the PDCP layer of the MeNB to enable the MeNB to distinguish between delayed PDU packets and the dropped PDU packets.

15. The method of claim 14, wherein the PDU packets are dropped to indicate an overflow buffer status to an internet protocol (IP) layer to reduce a packet rate to the PDCP layer at the UE.

16. The method claim 14, further comprising dropping the PDU packets due to delay or capacity constraints of at least one of: an X2 link between the MeNB and the SeNB, a radio link between the MeNB and the UE, or a radio link between the SeNB and the UE.

17. The method of claim 14, further comprising dropping the PDU packets to indicate a buffer status to an internet protocol (IP) layer, wherein the IP layer reduces a packet rate to the PDCP layer at the UE in response to the overflow buffer status.

18. The method of claim 11, further comprising requesting a modified uplink (UL) split ratio from the MeNB when the potential overflow occurs at the retransmission buffer of the UE.

19. The method of claim 11, wherein the UE includes an antenna, a touch sensitive display screen, a speaker, a microphone, a graphics processor, an application processor, an internal memory, or a non-volatile memory port.

20. A master evolved node B (MeNB) operable to mitigate traffic congestion, the MeNB having computer circuitry configured to:

determine that a retransmission buffer at the MeNB is storing a number of packets that exceed a selected threshold level;

adjust a downlink (DL) split ratio for the packets in the retransmission buffer, wherein the packets are to be sent to a secondary evolved node B (SeNB) or directly from the MeNB to a user equipment (UE); and split a bearer in the PDCP layer of the MeNB based on the adjusted DL split ratio to enable the UE and the SeNB to receive the packets in the retransmission buffer from the MeNB according to the adjusted DL split ratio.

21. The computer circuitry of claim 20, wherein the retransmission buffer is at a packet data convergence protocol (PDCP) layer of the MeNB.

22. The computer circuitry of claim 20, further configured to adjust the DL split ratio for the packets in the retransmission buffer in response to detecting delay or capacity constraints on an X2 link between the MeNB and the SeNB.

\* \* \* \* \*